United States Patent
Hoshino et al.

(10) Patent No.: US 6,659,746 B2
(45) Date of Patent: Dec. 9, 2003

(54) SHAFT SEAL STRUCTURE OF VACUUM PUMPS

(75) Inventors: Nobuaki Hoshino, Kariya (JP); Mamoru Kuwahara, Kariya (JP); Masahiko Okada, Kariya (JP); Shinya Yamamoto, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/085,675

(22) Filed: Feb. 26, 2002

(65) Prior Publication Data

US 2002/0141893 A1 Oct. 3, 2002

(30) Foreign Application Priority Data

Feb. 28, 2001 (JP) ......................................... 2001-054452

(51) Int. Cl.[7] ............................. F04C 18/18; F04C 27/00
(52) U.S. Cl. ..................... 418/104; 418/141; 418/206.6
(58) Field of Search ................................. 418/104, 141, 418/206.6

(56) References Cited

U.S. PATENT DOCUMENTS

| | | | |
|---|---|---|---|
| 4,632,650 A | 12/1986 | Frieden et al. | ................. 418/95 |
| 4,990,069 A | * 2/1991 | Guittet et al. | ................. 418/104 |
| 5,178,529 A | * 1/1993 | Obrist et al. | ................. 418/141 |

FOREIGN PATENT DOCUMENTS

| | | |
|---|---|---|
| JP | 60-145475 | 7/1985 |
| JP | 03-089080 | 4/1991 |
| JP | 06-081788 | 3/1994 |
| JP | 06-101674 | 4/1994 |
| JP | 09-196186 | 7/1997 |

* cited by examiner

Primary Examiner—John J. Vrablik
(74) Attorney, Agent, or Firm—Morgan & Finnegan, LLP

(57) ABSTRACT

A Roots pump rotates a plurality of rotors by a pair of rotary shafts to draw gas. Each rotary shaft extends through a rear housing member of the Roots pump. An annular shaft seal is fitted around each rotary shaft and is received in a recess formed in the rear housing member. A labyrinth seal is located between an end surface of each shaft seal and the bottom of the associated recess. A resin layer is firmly attached to the end surface of each shaft seal. As a result, oil is reliably prevented from leaking into a pump chamber.

12 Claims, 8 Drawing Sheets

SHAFT SEAL STRUCTURE OF VACUUM PUMPS

BACKGROUND OF THE INVENTION

The present invention relates to shaft seal structures of vacuum pumps that draw gas by operating a gas conveying body in a pump chamber through rotation of a rotary shaft.

Japanese Laid-Open Patent Publication Nos. 60-145475, 38-9080, 6-101674 describe a vacuum pump that includes a plurality of rotors. Each rotor functions as a gas conveying body. Two rotors rotate as engaged with each other, thus conveying gas through a pump chamber. More specifically, one rotor is connected to a first rotary shaft and the other is connected to a second rotary shaft. A motor drives the first rotary shaft. A gear mechanism transmits the rotation of the first rotary shaft to the second rotary shaft.

The gear mechanism is located in an oil chamber that retains lubricant oil. The pump of Japanese Laid-Out Patent Publication No. 60-145475 uses a labyrinth seal that seals the space between the oil chamber and the pump chamber to prevent the lubricant oil from leaking from the oil chamber to the pump chamber. More specifically, a partition separates the oil chamber from the pump chamber and has a through hole through which a rotary shaft extends. The labyrinth seal is fitted between the wall of the through hole and the corresponding portion of the rotary shaft. The pump of Japanese Laid-Open Patent Publication No. 3-89080 includes a bearing chamber for accommodating a bearing that supports a rotary shaft. An intermediate chamber is formed between the bearing chamber and the pump chamber. A partition separates the bearing chamber from the intermediate chamber and has a through hole through which a rotary shaft extends. A labyrinth seal is fitted between the wall of the through hole and the rotary shaft. The pump of Japanese Laid-Open Patent Publication No. 6-101674 includes a lip seal and a labyrinth seal. The seals are fitted between the wall of a through hole of a partition that separates the oil chamber from the pump chamber and a rotary shaft that extends through the through hole.

If the labyrinth seal includes a plurality of annular grooves, seal performance is maintained over time. To improve the seal performance of the labyrinth seal, the space between the rotary shaft, to which the labyrinth seal is located, and the through hole need be as small as possible. However, reducing the space requires an extremely high machining accuracy. It is thus difficult for improving the sealing performance of the labyrinth seal.

SUMMARY OF THE INVENTION

Accordingly, it is an objective of the present invention to improve seal performance of a labyrinth seal that prevents oil from leaking to a pump chamber of a vacuum pump.

To achieve the foregoing and other objectives and in accordance with the purpose of the present invention, a vacuum pump that draws gas by operating a gas conveying body in a pump chamber through rotation of a rotary shaft is provided. The vacuum pump includes an oil housing member and a labyrinth seal. The oil housing member forms an oil zone adjacent to the pump chamber. The rotary shaft extends from the pump chamber to the oil zone through the oil housing member. The labyrinth seal is located between the rotary shaft and the oil housing member. The labyrinth seal includes a resin layer, which minimizes the space between the rotary shaft and the oil housing.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(*a*) is a cross-sectional plan view showing a multiple-stage Roots pump of a first embodiment according to the present invention;

FIG. 1(*b*) is an enlarged cross-sectional view showing a seal structure around a first or a second rotary shaft of the pump of FIG. 1(*a*);

FIG. 2(*a*) is a cross-sectional view taken along line 2*a*—2*a* of FIG. 1(*a*);

FIG. 2(*b*) is a cross-sectional view taken along line 2*b*—2*b* of FIG. 1(*a*);

FIG. 2(*c*) is a cross-sectional view taken along line 2*c*—2*c* of FIG. 1(*a*);

FIG. 3(*a*) is an enlarged cross-sectional view showing the seal structure around the first or the second rotary shaft of the pump shown in FIG. 1(*a*);

FIG. 3(*b*) is an enlarged cross-sectional view showing a portion of the seal structure of FIG. 3(*a*);

DETAILED DESCRIPTION OF THE PREFERRED EMBODIMENTS

A first embodiment of a multiple-stage Roots pump 11 according to the present invention will now be described with reference to FIGS. 1(*a*) to 7.

Figures 1A, 1B:
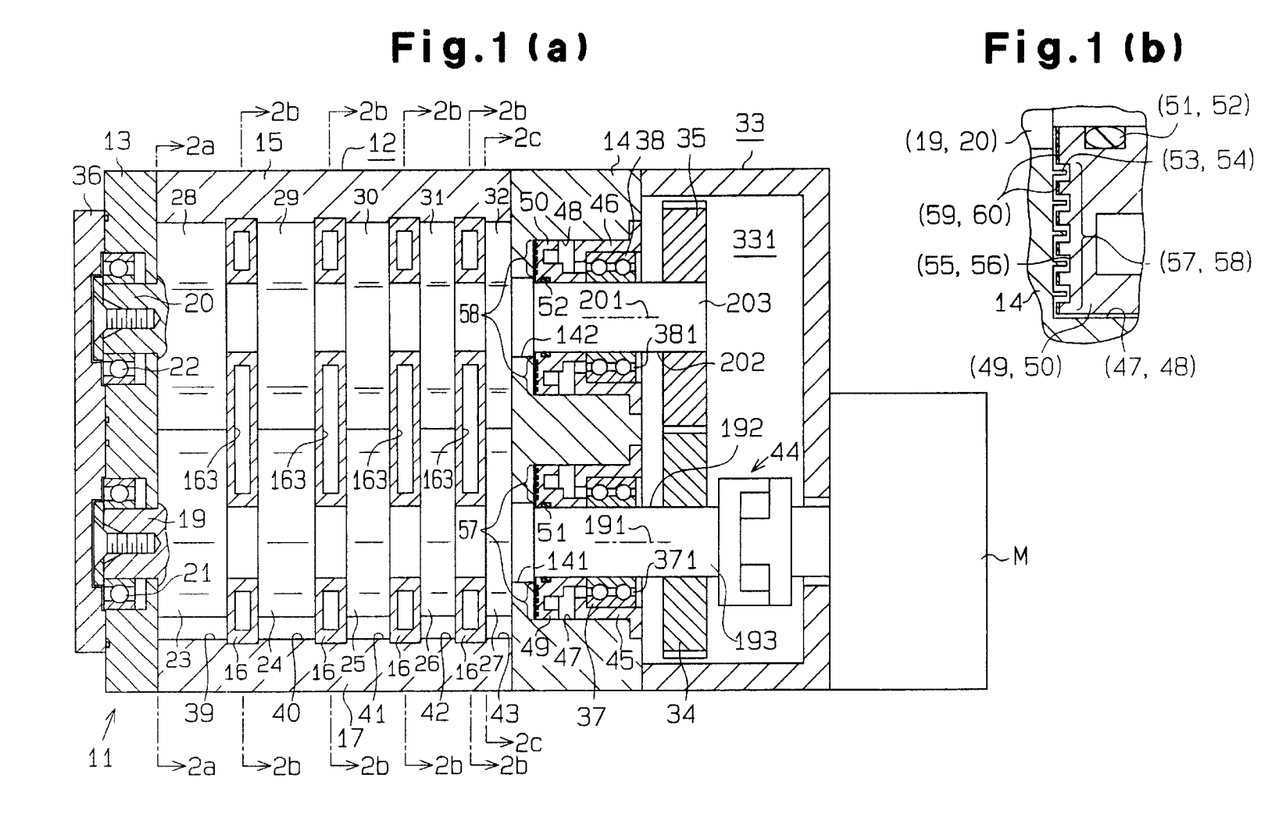

As shown in FIG. 1(*a*), the pump 11, or a vacuum pump, includes a rotor housing member 12 and a front housing member 13. The housing members 12, 13 are joined together. A lid 36 closes the front side of the front housing member 13. A rear housing member 14 is connected to the rear side of the rotor housing member 12. The rotor housing member 12 includes a cylinder block 15 and a plurality of (in this embodiment, four) chamber forming walls 16. As shown in FIG. 2(b), the cylinder block 15 includes a pair of block sections 17, 18, and each chamber forming wall 16 includes a pair of wall sections 161, 162. The chamber forming walls 16 are identical to one another.

As shown in FIG. 1(a), a first pump chamber 39 is formed between the front housing member 13 and the leftmost chamber forming wall 16, as viewed in the drawing. Second, third, and fourth pump chambers 40, 41, 42 are respectively formed between two adjacent chamber forming walls 16 in this order, as viewed from the left to the right in the drawing. A fifth pump chamber 43 is formed between the rear housing member 14 and the rightmost chamber forming wall 16.

A first rotary shaft 19 is rotationally supported by the front housing member 13 and the rear housing member 14 through a pair of radial bearings 21, 37. A second rotary shaft 20 is rotationally supported by the front housing member 13 and the rear housing member 14 through a pair of radial bearings 22, 38. The first and second rotary shafts 19, 20 are parallel with each other and extend through the chamber forming walls 16. The radial bearings 37, 38 are supported respectively by a pair of bearing holders 45, 46 that are installed in the rear housing member 14. The bearing holders 45, 46 are fitted respectively in a pair of recesses 47, 48 that are formed in the rear side of the rear housing member 14.

First, second, third, fourth, and fifth rotors 23, 24, 25, 26, 27 are formed integrally with the first rotary shaft 19. Likewise, first, second, third, fourth, and fifth rotors 28, 29, 30, 31, 32 are formed integrally with the second rotary shaft 20. As viewed in the directions of the axes 191, 201 of the rotary shafts 19, 20, the shapes and the sizes of the rotors 23–32 are identical. However, the axial dimensions of the first to fifth rotors 23–27 of the first rotary shaft 19 become gradually smaller in this order. Likewise, the axial dimensions of the first to fifth rotors 28–32 of the second rotary shaft 20 become gradually smaller in this order.

The first rotors 23, 28 are accommodated in the first pump chamber 39 as engaged with each other. The second rotors 24, 29 are accommodated in the second pump chamber 40 as engaged with each other. The third rotors 25, 30 are accommodated in the third pump chamber 41 as engaged with each other. The fourth rotors 26, 31 are accommodated in the fourth pump chamber 42 as engaged with each other. The fifth rotors 27, 32 are accommodated in the fifth pump chamber 43 as engaged with each other. The first to fifth pump chambers 39–43 are non-lubricated. Thus, the rotors 23–32 are maintained in a non-contact state with any of the cylinder block 15, the chamber forming walls 16, the front housing member 13, and the rear housing member 14. Further, the engaged rotors do not slide against each other.

A gear housing member 33 is coupled with the rear housing member 14. A pair of through holes 141, 142 are formed in the rear housing member 14. The rotary shafts 19, 20 extend respectively through the through holes 141, 142 and the associated recesses 47, 48. The rotary shafts 19, 20 thus project into the gear housing member 33 to form projecting portions 193, 203, respectively. A pair of gears 34, 35 are secured respectively to the projecting portions 193, 203 and are meshed together. An electric motor M is connected to the gear housing member 33. A shaft coupling 44 transmits the drive force of the motor M to the first rotary shaft 19. The motor M thus rotates the first rotary shaft 19 in the direction indicated by arrow R1 of FIGS. 2(a), 2(b), 2(c). The gears 34, 35 transmit the rotation of the first rotary shaft 19 to the second rotary shaft 20. The second rotary shaft 20 thus rotates in the direction indicated by arrow R2 of FIGS. 2(a), 2(b), 2(c). Accordingly, the first and second rotary shafts 19, 20 rotate in opposite directions. The gears 34, 35 form a gear mechanism to rotate the rotary shafts 19, 20 integrally.

A gear accommodating chamber 331 is formed in the gear housing member 33 and retains lubricant oil (not shown) for lubricating the gears 34, 35. The gear accommodating chamber 331 is a sealed oil zone. The gear housing member 33 and the rear housing member 14 thus form an oil housing, or an oil zone adjacent to the fifth pump chamber 43. The rear housing member 14 functions as a partition that separates the fifth pump chamber 43 from the oil zone. The gears 34, 35 rotate to agitate the lubricant oil in the gear accommodating chamber 331. The lubricant oil thus lubricates the radial bearings 37, 38. A gap 371, 381 of each radial bearing 37, 38 allows the lubricant oil to enter a portion of the associated recess 47, 48 that is located inward from the gap 371, 381. The recesses 47, 48 are thus connected to the gear accommodating chamber 331 through the gaps 371, 381 and form part of the oil zone.

As shown in FIG. 2(b), a passage 163 is formed in the interior of each chamber forming wall 16. Each chamber forming wall 16 has an inlet 164 and an outlet 165 that are connected to the passage 163. The adjacent pump chambers 39–43 are connected to each other by the passage 163 of the associated chamber forming wall 16.

Figure 2A:
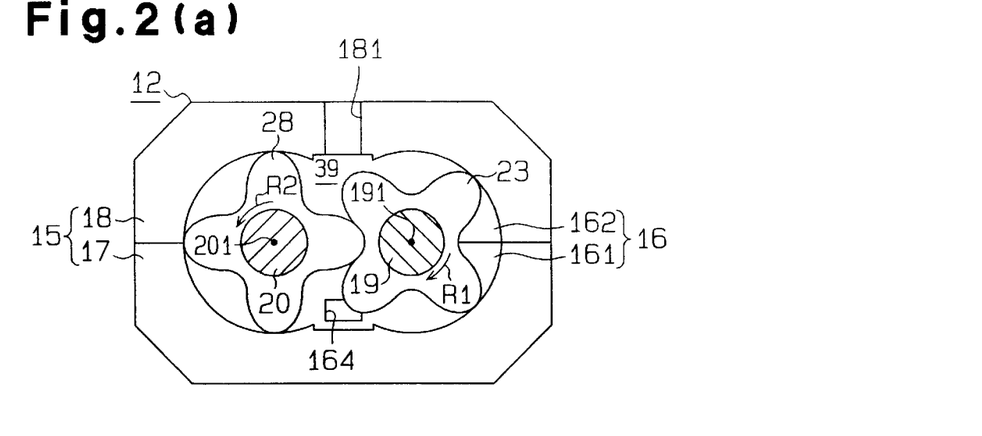
Figure 2B:
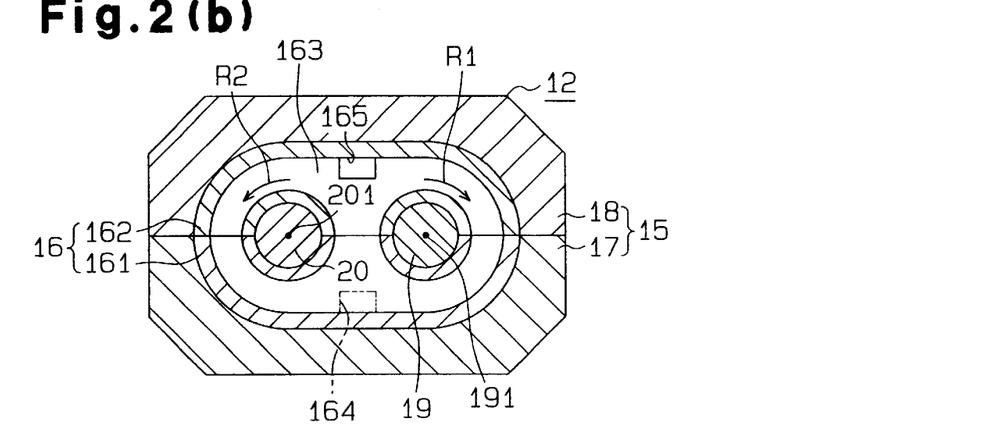
Figure 2C:
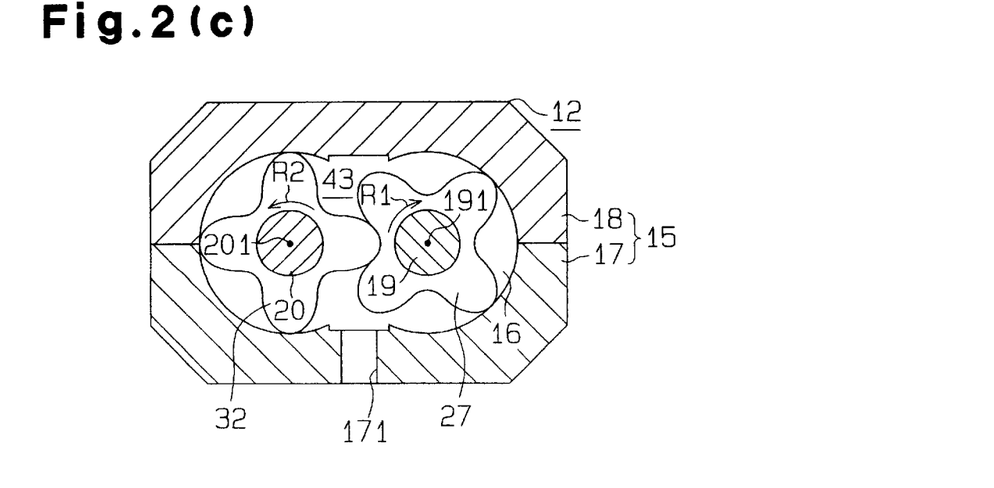

As shown in FIG. 2(a), an inlet 181 extends through the block section 18 of the cylinder block 15 and is connected to the first pump chamber 39. As shown in FIG. 2(c), an outlet 171 extends through the block section 17 of the cylinder block 15 and is connected to the fifth pump chamber 43. When gas enters the first pump chamber 39 from the inlet 181, rotation of the first rotors 23, 28 sends the gas to the second pump chamber 40 through the inlet 164 in the chamber forming wall, the passage 163, and the outlet 165. Afterwards, the gas flows from the second pump chamber 40 to the third, fourth, and fifth pump chambers 41, 42, 43 in this order, as repeating the above-described procedure. The volumes of the first to fifth pump chambers 39–43 become gradually smaller in this order. After reaching the fifth pump chamber 43, the gas is then discharged from the outlet 171 to the exterior of the vacuum pump 11. That is, each rotor 23–32 functions as a gas conveying body for conveying gas.

As shown in FIG. 1(a), first and second annular shaft seals 49, 50 are securely fitted around the first and second rotary shafts 19, 20, respectively. The shaft seals 49, 50 are located in the associated recesses 47, 48 and rotate integrally with the associated rotary shafts 19, 20. Each shaft seal 49, 50 forms a part of the corresponding rotary shaft 19, 20. A seal ring 51 is located between the inner circumferential side of the shaft seal 49 and a circumferential side 192 of the first rotary shaft 19. In the same manner, a seal ring 52 is located between the inner circumferential side of the shaft seal 50 and a circumferential side 202 of the second rotary shaft 20. Each seal ring 51, 52 prevents the lubricant oil from leaking from the associated recess 47, 48 to the fifth pump chamber 43 along the circumferential side 192, 202 of the associated rotary shaft 19, 20.

Figures 3A, 3B:
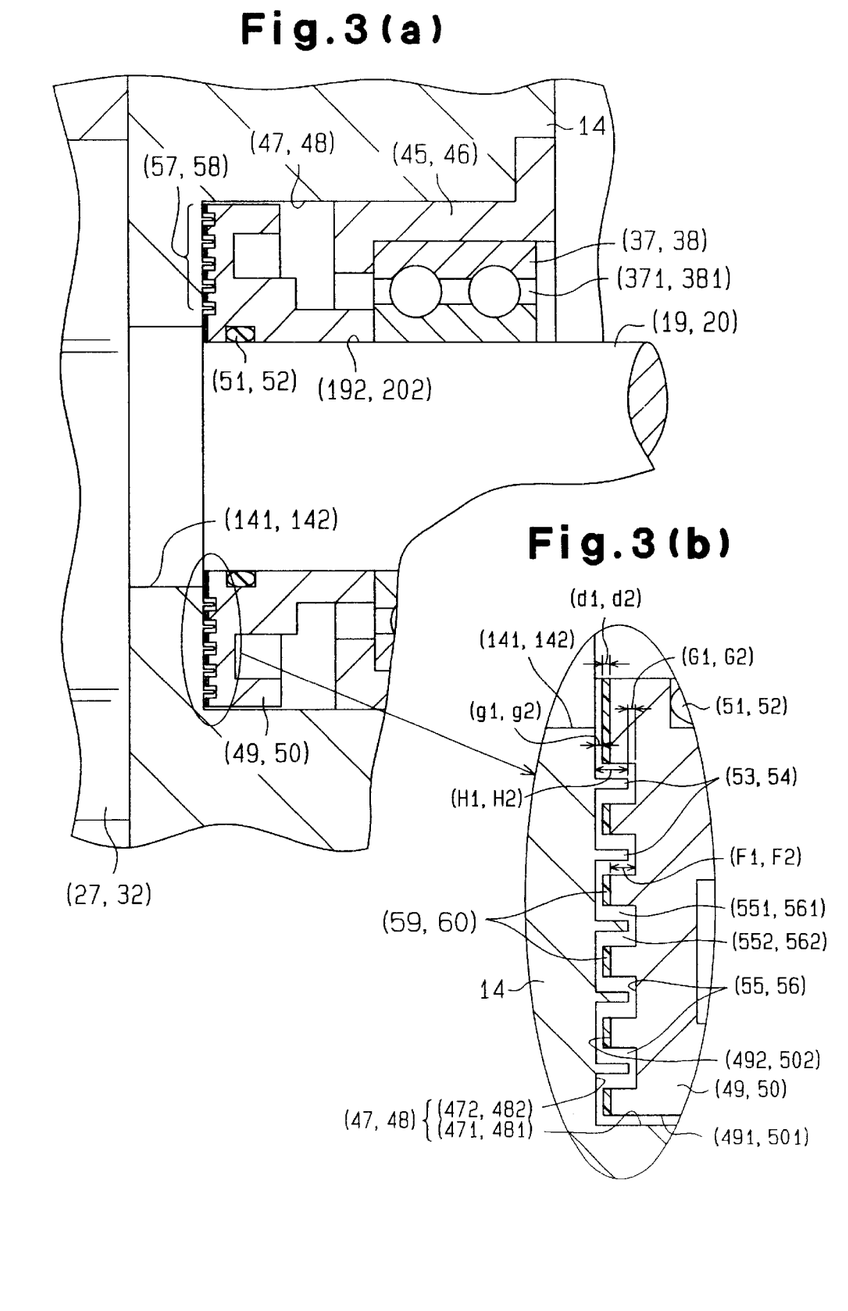

As shown in FIGS. 3(a) and 3(b), there is a gap between an outer circumferential side 491, 501 of a portion with a maximum diameter of each shaft seal 49, 50 and the circumferential wall 471, 481 of the associated recess 47, 48. Likewise, there is a gap between a front side 492, 502 of each shaft seal 49, 50 and a bottom 472, 482 of the associated recess 47, 48.

Figure 4:
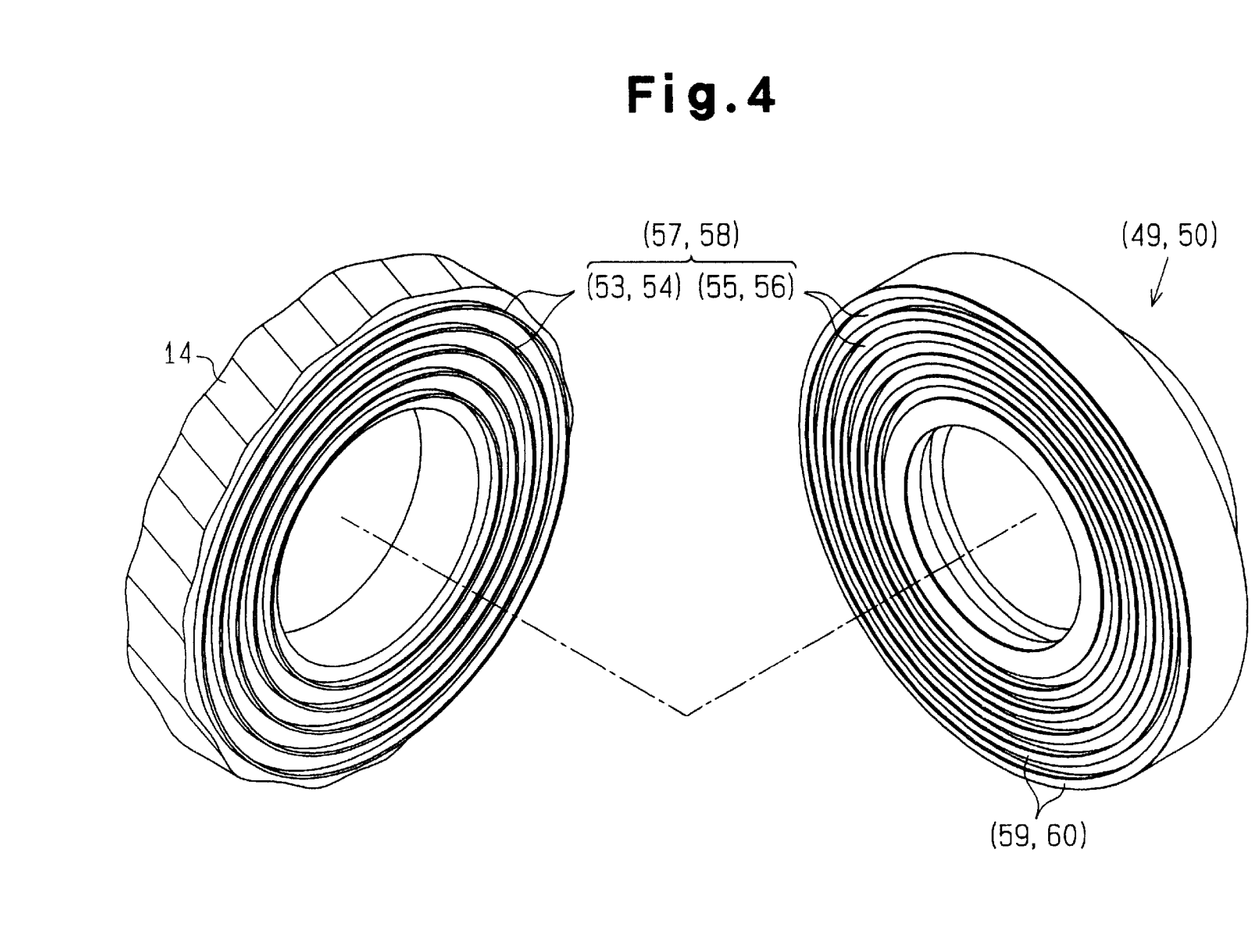
FIG. 4 is a perspective view showing a first annular shaft seal.

As shown in FIG. 4, a plurality of annular projections 53 coaxially project from the bottom 472 of the recess 47. In the same manner, a plurality of annular projections 54 coaxially project from the bottom 482 of the recess 48. Further, a plurality of annular grooves 55 are coaxially formed in the front side 492 of the shaft seal 49 that opposes the bottom 472 of the recess 47. In the same manner, a plurality of annular grooves 56 are coaxially formed in the front side 502 of the shaft seal 50 that opposes the bottom 482 of the recess 48. As shown in FIGS. 1(b), 3(a) and 3(b), each annular projection 53, 54 projects in the associated groove 55, 56 such that the distal end of the projection 53, 54 is located close to the bottom of the groove 55, 56. Each projection 53 divides the interior of the associated groove 55 of the first shaft seal 49 to a pair of labyrinth chambers 551, 552. Each projection 54 divides the interior of the associated groove 56 of the second shaft seal 50 to a pair of labyrinth chambers 561, 562.

The projections 53 and the grooves 55 form a first labyrinth seal 57 corresponding to the first rotary shaft 19. The projections 54 and the grooves 56 form a second labyrinth seal 58 corresponding to the second rotary shaft 20.

As shown in FIGS. 3(a) and 3(b), resin layers 59, 60 are securely applied on the front sides 492, 502 of the first and second shaft seals 49, 50, respectively. A gap g1 between the resin layer 59 and the bottom 472 is smaller than a gap G1 between the distal end of each projection 53 and the bottom of the associated groove 55. A gap g2 between the resin layer 60 and the bottom 482 is smaller than a gap G2 between the distal end of each projection 54 and the bottom of the associated groove 56. Each gap G1, G2 is substantially equal to the gap between the outer circumferential side 491, 502 of the associated shaft seal 49, 50 and the circumferential wall 471, 481 of the recesses 47, 48. The gap g1 is a minimum gap between the first shaft seal 49 and the rear housing member 14. The gap g2 is a minimum gap between the second shaft seal 50 and the rear housing member 14. In the present invention, the term "minimum gap" refers to a gap with a dimension that improves sealing of the labyrinth chambers.

The first embodiment has the following effects.

When the Roots pump 11 is completely assembled, the resin layer 59, 60 of each shaft seal 49, 50 is in contact with the bottom 472, 482 of the associated recess 47, 48. The recesses 47, 48 are located in the rear housing member 14 that is formed of metal. When the Roots pump 11 operates, the resin layers 59, 60 simply slide along the bottoms 472, 482 of the associated recesses 47, 48 without affecting rotation of each rotary shaft 19, 20.

More specifically, when manufacturing the Roots pump 11, the total (F1+d1) of the depth F1 of each annular groove 55 (see FIGS. 3(a) and 3(b)) and the thickness d1 of the resin layer 59 (see FIGS. 3(a) and 3(b)) is selected to be slightly larger than the projecting amount H1 of each annular projection 53 (see FIGS. 3(a) and 3(b)). The first rotary shaft 19 and the first shaft seal 49 are then assembled together such that the resin layer 59 contacts the bottom 472 of the recess 47. In this state, the first rotary shaft 19 is allowed to rotate smoothly. Likewise, the total (F2+d2) of the depth F2 of each annular groove 56 (see FIGS. 3(a) and 3(b)) and the thickness d2 of the resin layer 60 (see FIGS. 3(a) and 3(b)) is selected to be slightly larger than the projecting amount H2 of each annular projection 54 (see FIGS. 3(a) and 3(b)). The second rotary shaft 20 and the second shaft seal 50 are then assembled together such that the resin layer 60 contacts the bottom 482 of the recess 48. In this state, the second rotary shaft 20 is allowed to rotate smoothly.

Accordingly, each resin layer 59, 60 minimizes the minimum gap g1, g2 between the shaft seal 49, 50 and the rear housing member 14. If sealing of each labyrinth chamber 551, 552, 561, 562 is improved, the seal performance of each labyrinth seal 57, 58 is also improved. The improved sealing of the labyrinth chambers 551, 552, 562, 562 can be achieved by reducing the volume of each minimum gap g1, g2. That is, each resin layer 59, 60 of this embodiment improves the seal performance of the labyrinth seals 57, 58.

The front side 492, 502 of each shaft seal 49, 50, which is fitted around the associated rotary shaft 19, 20, has a diameter larger than that of the circumferential side 192, 202 of the rotary shaft 19, 20. In this embodiment, each labyrinth seal 57, 58 is located between the front side 492, 502 of the associated shaft seal 49, 50 and the bottom 472, 482 of the recess 47, 48. Thus, as compared to the case in which a labyrinth seal is located between the circumferential side 192, 202 of each rotary shaft 19, 20 and the rear housing member 14, the diameter of each labyrinth seal 57, 58 is relatively large. The larger the diameter of each labyrinth seal 57, 58 is, the greater the volume of each labyrinth chamber 551, 552, 561, 562 is. This improves the seal performance of the labyrinth seals 57, 58. Thus, arrangement of each labyrinth seal 57, 58 of this embodiment is preferable in increasing the volume of each labyrinth chamber 551, 552, 561, 562 for improving the seal performance of the labyrinth seals 57, 58.

As described, each resin layer 59, 60 contacts the bottom 472, 482 of the associated recess 47, 48 without hampering the rotation of each rotary shaft 19, 20. Thus, locating each resin layer 59, 60 at the front side 492, 502 of the associated shaft seal 49, 50 is preferable in minimizing the minimum gaps g1, g2.

The labyrinth seals 57, 58 also stop gas leak. More specifically, when the Roots pump 11 operates, the pressure in each pump chamber 39–43 exceeds the atmospheric pressure. However, each labyrinth seal 57, 58 prevents gas from leaking from the fifth pump chamber 43 to the gear accommodating chamber 331 along the surface of the associated shaft seal 49, 50. That is, the labyrinth seals 57, 58 stop both oil leak and gas leak and are optimal non-contact type seals.

If the Roots pump 11 is a dry type, the lubricant oil does not circulate in any pump chamber 39–43. It is preferred that the present invention be applied to this type of pump.

The present invention may be modified, as shown in second to ninth embodiments of FIGS. 5 to 12. Although only the labyrinth seal for the first rotary shaft 19 is illustrated in FIGS. 5 to 12, an identical labyrinth seal is provided for the second rotary shaft 20 of these embodiments.

Figure 5:
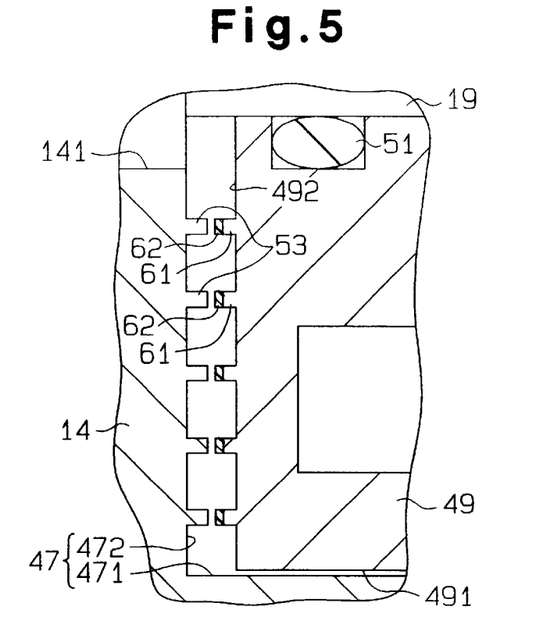
FIG. 5 is a cross-sectional view showing a major portion of a seal structure of a second embodiment according to the present invention.

In the second embodiment, as shown in FIG. 5, a plurality of annular projections 61 that project from the front side 492 of the shaft seal 49 oppose the annular projections 53, which project from the bottom 472 of the recess 47. A resin layer 62 is formed at the distal end of each projection 61. The annular projections 53, 61 form a labyrinth seal.

Figure 6:
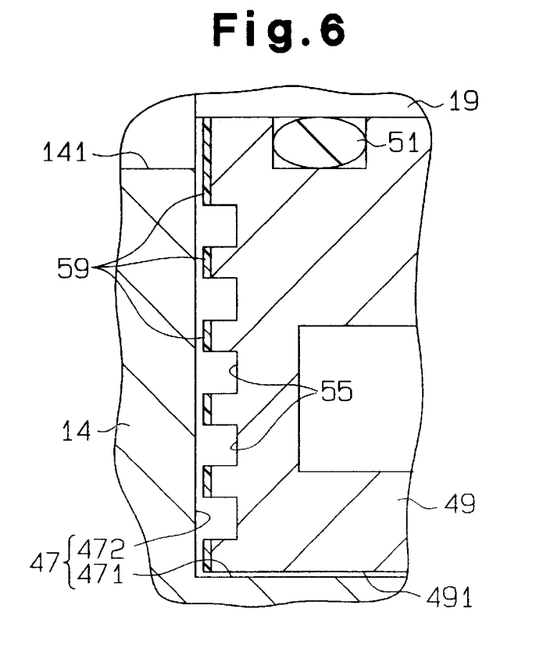
FIG. 6 is a cross-sectional view showing a major portion of a seal structure of a third embodiment according to the present invention.

As shown in FIG. 6, the third embodiment does not include the annular projections 53 that otherwise project from the bottom 472 of the recess 47, unlike the first embodiment. Instead, the annular grooves 55 formed in the shaft seal 49 form a labyrinth seal.

Figure 7:
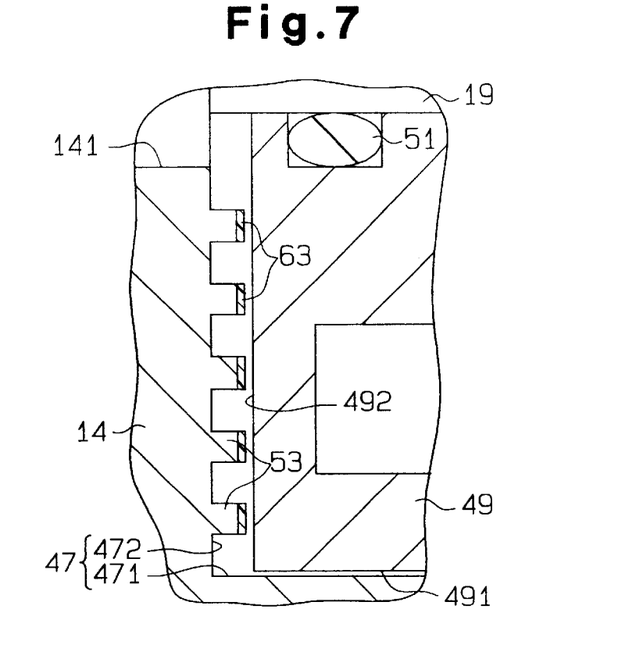
FIG. 7 is a cross-sectional view showing a major portion of a seal structure of a fourth embodiment according to the present invention.

As shown in FIG. 7, the fourth embodiment does not include the annular grooves 55 that are otherwise formed in the shaft seal 49, unlike the first embodiment. Instead, the annular projections 53 projecting from the bottom 472 of the recess 47 form a labyrinth seal. A resin layer 63 is formed at the distal end of each projection 53.

Figure 8:
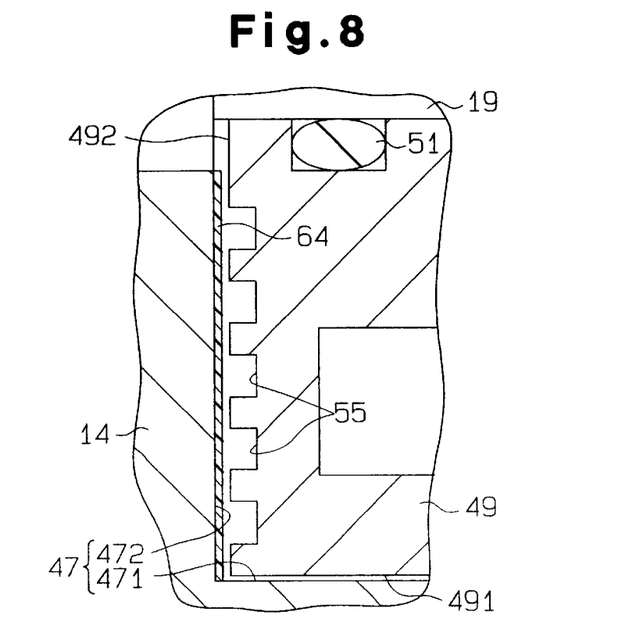
FIG. 8 is a cross-sectional view showing a major portion of a seal structure of a fifth embodiment according to the present invention.

As shown in FIG. 8, the fifth embodiment does not include the annular projections 53 that otherwise project from the bottom 472 of the recess 47, unlike the first embodiment. Instead, the annular grooves 55 of the shaft seal 49 form a labyrinth seal. A resin layer 64 is formed on the bottom 472 of the recess 47.

Figure 9:
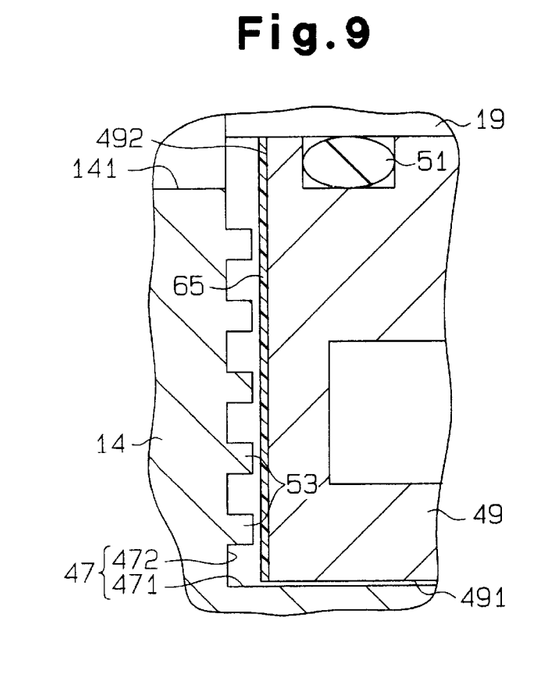
FIG. 9 is a cross-sectional view showing a major portion of a seal structure of a sixth embodiment according to the present invention.

As shown in FIG. 9, the sixth embodiment does not include the annular grooves 55 that are otherwise formed in the shaft seal 49, unlike the first embodiment. Instead, the annular projections 53 projecting from the bottom 472 of the recess 47 form a labyrinth seal. A resin layer 65 is formed at the front side 492 of the shaft seal 49.

Figure 10:
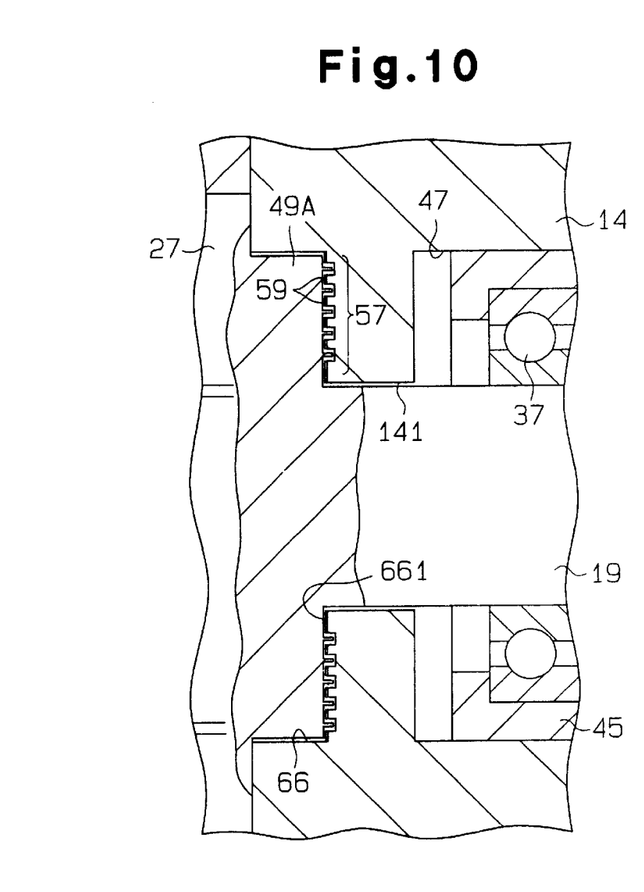
FIG. 10 is a cross-sectional view showing a major portion of a seal structure of a seventh embodiment according to the present invention.

In the seventh embodiment, as shown in FIG. 10, a shaft seal 49A is formed integrally with the rotary shaft 19 and is connected to the fifth rotor 27. The shaft seal 49A is accommodated in a recess 66 formed in the side of the rear housing member 14 that opposes the rotor housing member 12. A labyrinth seal 57 is located between the rear side of the shaft seal 49A and a bottom 661 of the recess 66.

Figure 11:
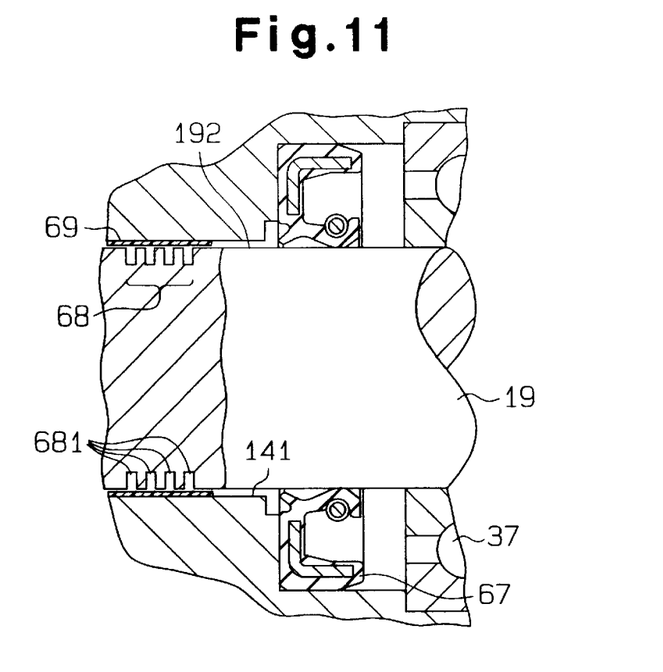
FIG. 11 is a cross-sectional view showing a major portion of a seal structure of an eighth embodiment according to the present invention.

In the eighth embodiment, as shown in FIG. 11, a rubber lip seal 67 is located on the rotary shaft 19. The lip seal 67 slides on the circumferential side 192 of the rotary shaft 19. A labyrinth seal 68 is located between the through hole 141 and the circumferential side 192 of the rotary shaft 19. The labyrinth seal 68 includes annular grooves 681 formed in the circumferential side 192. A resin layer 69 is formed on part of the circumferential side of the through hole 141 that faces the annular grooves 681.

Figure 12:
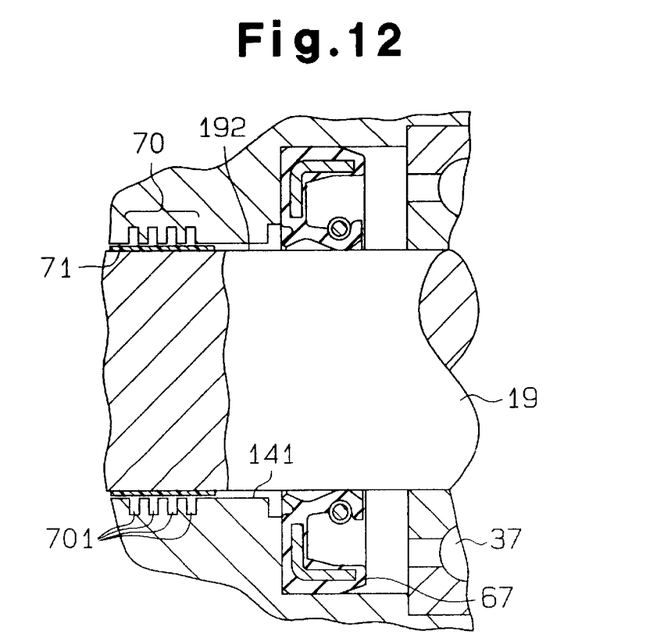
FIG. 12 is a cross-sectional view showing a major portion of a seal structure of a ninth embodiment according to the present invention.

FIG. 12 illustrates the ninth embodiment. The ninth embodiment is different from the eighth embodiment in that labyrinth seal 70 is formed by annular grooves 701, which are formed in the inner circumferential side of the through hole 141. A resin layer 71 is formed on part of the circumferential side 192 of the rotary shaft 19 that faces the annular grooves 701.

It should be apparent to those skilled in the art that the present invention may be embodied in many other specific forms without departing from the spirit or scope of the invention. Particularly, it should be understood that the invention may be embodied in the following forms.

In the first embodiment, a resin layer may be applied at the distal end of each projection 53, 54.

A resin plate may be located between the bottom 472, 482 of each recess 47, 48 and the front side 492, 502 of the associated shaft seal 49, 50, thus forming a resin layer.

The present invention may be applied to other types of vacuum pumps than Roots types.

Therefore, the present examples and embodiments are to be considered as illustrative and not restrictive and the invention is not to be limited to the details given herein, but may be modified within the scope and equivalence of the appended claims.

What is claimed is:

1. A vacuum pump that draws gas by operating a gas conveying body in a pump chamber through rotation of a rotary shaft, the vacuum pump comprising:
    an oil housing member, wherein the oil housing member forms an oil zone adjacent to the pump chamber, and the rotary shaft extends from the pump chamber to the oil zone through the oil housing member; and
    a labyrinth seal, which is located between the rotary shaft and the oil housing member and is formed on the opposite portions of the rotary shaft and the oil housing member and is directly formed on the oil housing member, wherein the labyrinth seal includes a resin layer, which minimizes the space between the rotary shaft and the oil housing member.

2. The vacuum pump according to claim 1, wherein relative rotation is permitted between the resin layer and at least one of the rotary shaft and the oil housing member.

3. The vacuum pump according to claim 1, wherein the resin layer is located on at least one of the rotary shaft and the oil housing member.

4. The vacuum pump according to claim 1, further comprising a bearing that supports the rotary shaft, wherein the bearing is supported by the oil housing member and is located in the oil zone.

5. The vacuum pump according to claim 1, wherein the rotary shaft includes an annular shaft seal, which is located on the rotary shaft to rotate integrally with the rotary shaft, wherein the oil housing member has a recess, in which the shaft seal is located, and wherein the labyrinth seal is located between the shaft seal and a surface defining the recess.

6. The vacuum pump according to claim 5, wherein the labyrinth seal is located between a bottom of the recess and a side of the shaft seal that faces the bottom of the recess.

7. The vacuum pump according to claim 6, wherein the labyrinth seal includes a plurality of coaxial annular grooves formed in the side of the shaft seal and a plurality of coaxial annular projections formed on the bottom of the recess, wherein each annular projection is located in one of the annular grooves, wherein the resin layer is one of a plurality of resin layers, and wherein each resin layer is located on a part of the side between an adjacent pair of the grooves.

8. The vacuum pump according to claim 1, wherein the rotary shaft is one of a plurality of parallel rotary shafts, a gear mechanism connects the rotary shafts to one another such that the rotary shafts rotate integrally, and the gear mechanism is located in the oil zone.

9. The vacuum pump according to claim 8, wherein a plurality of rotors are formed around each rotary shaft such that each rotor functions as the gas conveying body, and the rotors of one rotary shaft are engaged with the rotors of another rotary shaft.

10. A Roots pump, comprising:
    a housing, wherein the housing has a pump chamber and an oil zone, and the housing includes a partition that separates the pump chamber from the oil zone;
    a pair of parallel rotary shafts, wherein each rotary shaft extends from the pump chamber to the oil zone through the partition;
    a pair of rotors, each of which is located in the pump chamber and is formed around one of the rotary shafts, wherein the rotor of one rotary shaft engages with the rotor of the other;
    a gear mechanism, which is located in the oil zone, wherein the gear mechanism connects the rotary shafts to each other such that the rotary shafts rotate integrally;
    a pair of annular shaft seals, each of which is located in the oil zone and is fitted around one of the rotary shafts to rotate integrally with the rotary shaft, wherein each shaft seal has a side that faces the partition;
    a pair of opposite surfaces directly formed on the partition, wherein each opposite surface faces the side of one of the shaft seals; and
    a pair of labyrinth seals, each of which is located between the side of one of the shaft seals and the corresponding opposite surface, wherein each labyrinth seal includes a resin layer, which minimizes the space between the corresponding side and the corresponding opposite surface.

11. The Roots pump according to claim 10, wherein the partition includes a pair of recesses, in each of which one of the shaft seals is accommodated, and wherein each opposite surface is a bottom of one of the recesses.

12. The Roots pump according to claim 11, wherein each labyrinth seal includes a plurality of coaxial annular grooves formed in the side of the corresponding shaft seal and a plurality of coaxial annular projections formed on the bottom of the corresponding recess, wherein each annular projection is located in one of the annular grooves, wherein each resin layer is one of a plurality of resin layers, and wherein each resin layer is located on a part of the side of the corresponding shaft seal between an adjacent pair of the grooves.

* * * * *